Oct. 21, 1958      E. E. REESE      2,856,783
WINDSHIELD WIPER ACTUATING MECHANISM
Filed Sept. 23, 1955      2 Sheets-Sheet 1
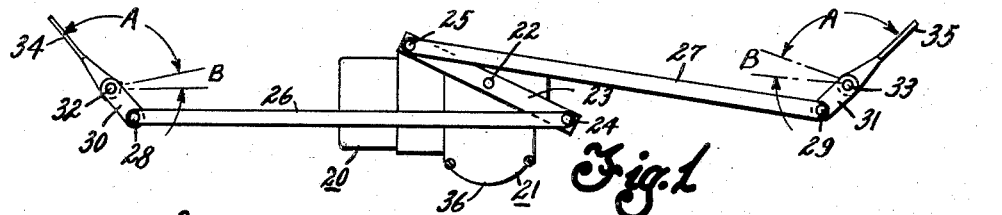
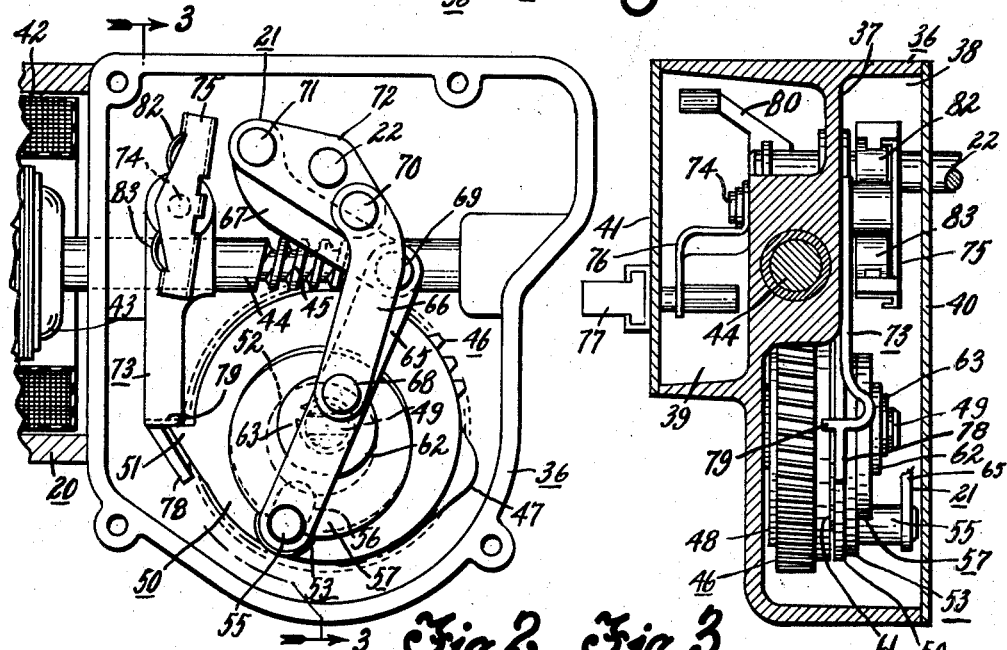
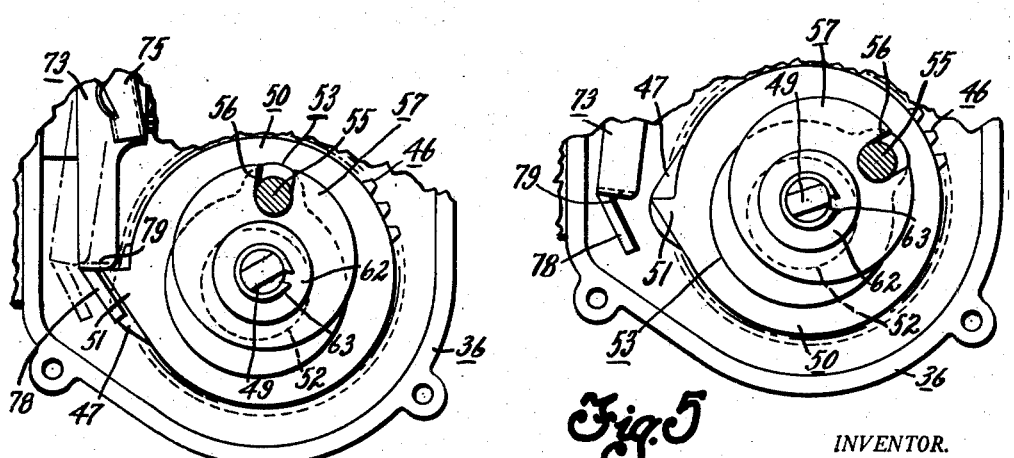
INVENTOR.
ELMER E. REESE
BY
*G. H. Strickland*
HIS ATTORNEY Oct. 21, 1958     E. E. REESE     2,856,783
WINDSHIELD WIPER ACTUATING MECHANISM
Filed Sept. 23, 1955     2 Sheets-Sheet 2
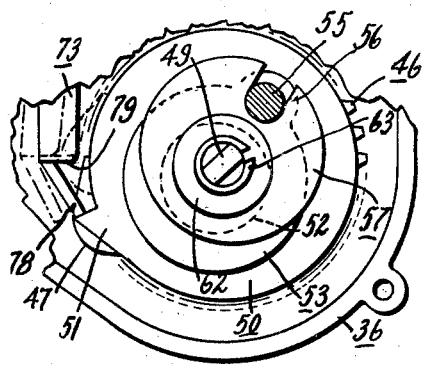
*Fig. 6*
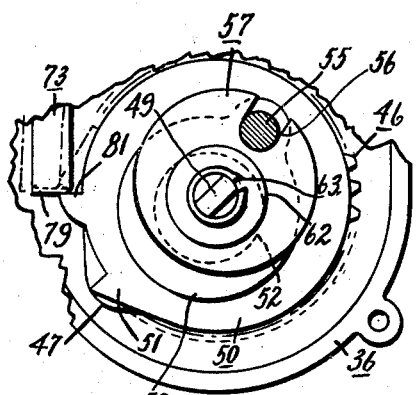
*Fig. 12*
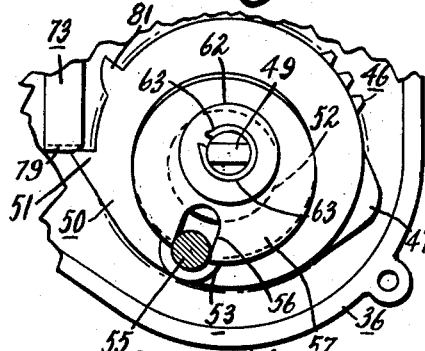
*Fig. 13*
*Fig. 7*
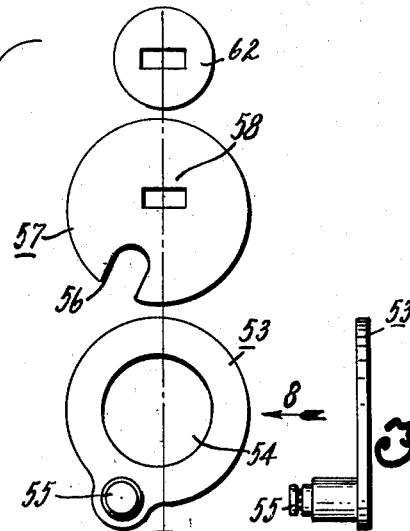
*Fig. 8*
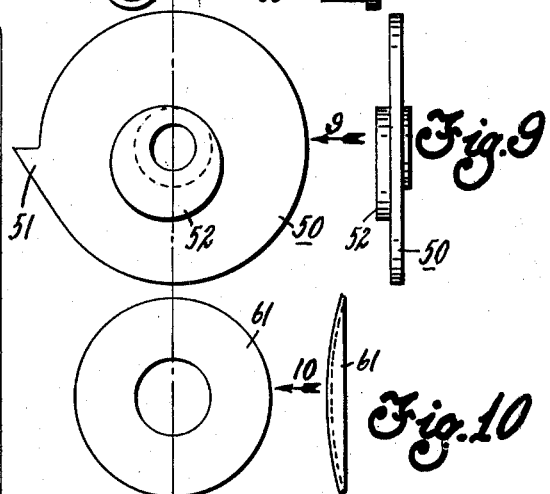
*Fig. 9*
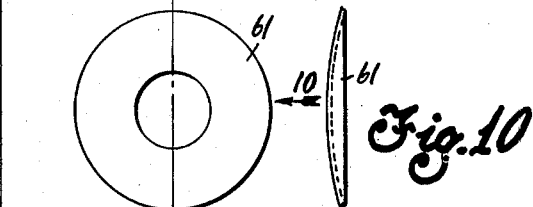
*Fig. 10*
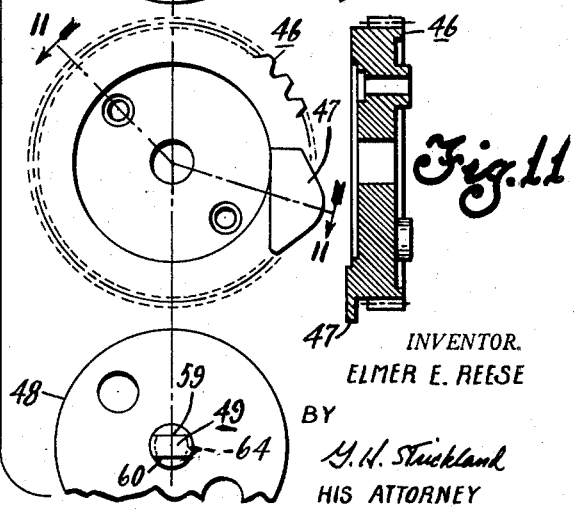
*Fig. 11*
INVENTOR.
ELMER E. REESE
BY
G. H. Strickland
HIS ATTORNEY United States Patent Office 2,856,783
Patented Oct. 21, 1958

2,856,783

WINDSHIELD WIPER ACTUATING MECHANISM

Elmer E. Reese, Rochester, N. Y., assignor to General Motors Corporation, Detroit, Mich., a corporation of Delaware Application September 23, 1955, Serial No. 536,060

10 Claims. (Cl. 74—70)

This invention pertains to mechanical movements, and particularly to mechanism for converting rotation to oscillation including means for varying the amplitude of oscillation imparted to a driven member which may be used to actuate windshield wipers.

Heretofore it has been proposed to construct a crank assembly including a radially adjustable crank pin, a yoke for guiding the crank pin, an eccentric cooperable with the yoke for varying the throw of crank pin, and a torsion spring opposing outward radial movement of the crank pin. A crank assembly of this type is disclosed in copending application Serial No. 450,890, filed August 19, 1954, in the name of Walter D. Harrison, and assigned to the assignee of this invention. While crank assemblies of the aforementioned type operate satisfactorily, they have a tendency to be noisy due to impact between the crank pin and the yoke when the throw of the crank pin is reduced to a minimum by the torsion spring. This invention relates to a similar type crank assembly which is much quieter in operation. Accordingly, among my objects are the provision of a mechanical movement for converting rotation to oscillation including means for varying the amplitude of oscillation; the further provision of mechanical movement including adjustable crank means and eccentric means for varying the throw of the crank means; and the still further provision of mechanical movement of the aforesaid type including cooperable latch and disk abutment members for effecting adjustment of the crank means in combination with cam means for disengaging the latch and disk members at a predetermined angular position of the crank assembly.

The aforementioned and other objects are accomplished in the present invention by utilizing eccentric means to vary the radial position of a crank pin with respect to the axis of a shaft which rotates the crank pin. Specifically, in one embodiment the crank assembly comprises a rotatable shaft; a yoke member connected to rotate with the shaft; a cam having a circular aperture eccentric with respect to the shaft axis and carrying a crank pin; a disk having an eccentric portion and a peripheral lug projection; a worm gear having a peripheral cam projection; and a plate for drivingly connecting the worm gear to the shaft. In order to establish a yieldable driving connection between the disk and the cam, a spring washer is interposed between the worm gear and the disk. The disk lug projection cooperates with a latch arm having a pair of spaced latching surfaces. In a second embodiment, the disk has a pair of circumferentially spaced lug projections, and the latch arm has a single latching surface.

In both embodiments the plate is rigidly attached to the shaft and connected to the worm gear. The shaft is rotatably journalled in the housing, and the worm gear is driven through a worm by any suitable rotating means, such as a unidirectional electric motor. The eccentric of the disk is disposed in a circular aperture of the cam member which is connected to rotate with the shaft by reason of the crank pin being disposed in a radially extending slot of the yoke member. Under normal running conditions the spring washer interposed between the worm gear and the disk establishes a driving connection so that the disk rotates with the shaft, and hence the radial position of the crank pin remains the same throughout each revolution of the shaft. The several parts of the crank assembly are maintained in assembled relation by means of a washer and a snap ring.

During normal running operation the eccentric is positioned so that the crank pin is located at a minimum radial distance from the axis of the shaft. The disk constitutes a driven element, the worm gear constitutes a driving member, and a second oscillatable shaft constitutes the driven member in the windshield wiper actuating mechanism. The crank pin and the oscillatable driven shaft are operatively interconnected by a linkage comprising a swingable connecting rod, a pair of crossed links and a rocker arm, a linkage of this type being disclosed in the aforementioned copending application.

In the first embodiment the actuating mechanism includes a toggle actuated latch arm having two latching surfaces. When it is desired to increase the amplitude of oscillation in part of the driven member so as to park the wiper blades, the toggle mechanism is actuated to snap the latch arm into operative relationship with respect to the lug projection on the disk. At a predetermined angular position of the crank assembly the first latching surface of the latch arm will engage the disk projection. This action will tend to restrain rotation of the disk during continued rotation of the worm gear and shaft. However, shortly thereafter the cam projection on the worm gear will engage the latch arm so as to release the disk for rotation with the worm gear. Thereafter, the second latching surface of the latch arm will engage the disk projection so that during continued rotation of the worm gear the cam carrying the crank pin will rotate relative to the eccentric thereby increasing the throw of the crank pin due to outward radial movement thereof. When the throw of the crank pin is increased to a maximum, the amplitude of oscillation imparted to the driven member and the wiper blades operatively connected therewith is, likewise, increased and when the wiper blades reach the parked position, suitable automatic switch means of the type shown in copending application Serial No. 435,012, filed June 7, 1954, in the name of Walter D. Harrison, may be actuated to de-energize and dynamically brake the motor to a standstill.

When operation is resumed by re-energizing the electric motor, the toggle mechanism for the latch arm is reversed but the latch arm remains in the operative position. Accordingly, rotation is imparted to the worm gear while the disk remains stationary. However, before the worm gear has rotated a full revolution the cam projection thereon engages the latch arm and frees the same from the disk projection thereby permitting the toggle mechanism to move the latch arm to an inoperative position. Moreover, the rotation of the worm gear relative to the disk assembly during starting again reduces the throw of the crank pin to a minimum so that during running operation, oscillation of a fixed amplitude is imparted to the driven member and the wiper blades.

In the second embodiment the toggle actuated latch arm has a single latching surface and the disk is formed with a pair of circumferentially spaced peripheral abutments. In parking the mechanism to increase the throw of the crank pin, the latch arm is again moved into operative position with respect to disk so that at a predetermined angular position of the crank assembly, the first disk projection will engage the latch arm and temporarily restrain rotation of the disk. However, shortly thereafter the worm gear cam projection will release the latch arm and the disk will again rotate with the worm gear. Thereafter, the latch arm will engage the second disk projection so as to restrain rotation of the disk during continued rotation of the worm gear. In this manner, the throw of the crank pin is increased to a maximum and the wiper blades are driven to the parked position at which time the motor is deenergized and dynamically braked by suitable switch means.

In order to initiate operation of the actuating mechanism the toggle mechanism of the latch arm is reversed and the cam projection of the worm gear releases the latch arm when the crank throw has been reduced to a minimum.

Further objects and advantages of the present invention will be apparent from the following description, reference being had to the accompanying drawings wherein preferred embodiments of the present invention are clearly shown.

In the drawings:

Figure 1 is a view in elevation of windshield wiper apparatus embodying the crank assembly of this invention.

Figure 2 is a fragmentary view partly in section and partly in elevation, of windshield wiper actuating mechanism constructed according to this invention, in the parked position.

Figure 3 is a sectional view, with certain parts removed taken along line 3—3 of Figure 2.

Figures 4, 5 and 6 are fragmentary views, partly in section and partly in elevation of the actuating mechanism in the coming out of park condition, the running condition, and the going into park condition, respectively.

Figure 7 is an exploded view of certain parts of the crank assembly illustrating the relative positions with the mechanism in the parked position.

Figures 8 through 10 are views, in elevation, taken in the direction of arrows 8 through 10, respectively, of Figure 7.

Figure 11 is a sectional view taken along line 11—11 of Figure 7.

Figures 12 and 13 are fragmentary views, partly in section and partly in elevation of a modified actuating mechanism in the going into park condition and the parked position, respectively.

With particular reference to Figure 1, windshield wiper apparatus is depicted as including unidirectional electric motor 20 which actuates motion converting mechanism 21 disposed in a housing having an oscillatory output shaft 22. The shaft 22 is connected to a crank member 23, opposite ends of which are pivotally connected at 24 and 25 to a pair of links 26 and 27, respectively. The other ends of links 26 and 27 are pivotally connected at 28 and 29, respectively, with a pair of rocker arms 30 and 31. Rocker arms 30 and 31 are connected to wiper transmission shafts 32 and 33, respectively, which receive wiper arm and blade assemblies 34 and 35, respectively. The general arrangement of the wiping apparatus is such that during normal running operation, the wiper arms and blades 34 and 35 are oscillated asymmetrically throughout the angle depicted by A. When the electric motor 20 is deenergized, the actuating mechanism 21 is adjusted to increase the amplitude of oscillation to move the wiper arms and blades 34 and 35 throughout the angle B so as to bring the wiper blades to a parked position against the vehicle cowl.

With particular reference to Figures 2 and 3, the motion converting mechanism 21 will be described in greater detail. The mechanism 21 is disposed within a housing 36 having an intergral web 37 which divides the housing into two chambers 38 and 39. Chamber 38 is closed by a plate 40 and contains the mechanical movement, while chamber 39 is closed by a plate 41 and contains the switch means, not shown, for controlling the electric motor 20. The electric motor is preferably of the cumulative compound wound, direct current type and includes field windings 42 and an armature 43, the armature 43 having a shaft 44 with a worm portion 45.

The worm 45 drivingly engages a worm gear 46 constituting the driving member of the crank assembly. As seen in Figures 7 and 11, the worm gear 46 is formed with a peripheral cam projection 47 which is axially spaced from the toothed periphery of the gear. The worm gear 46 is attached to a plate 48 by a pair of rivets, not shown, the plate 48 being rigidly connected to a shaft 49 rotatably journalled in the web 37. Accordingly, upon rotation of the worm gear 46 by the electric motor 20, rotation will be imparted to the shaft 49.

A disk 50 is rotatably journalled on the shaft 49, the disk 50 having a peripheral lug projection 51 and an eccentric hub portion 52 as clearly shown in Figures 7 and 9. A cam member 53 having a circular aperture 54 and carrying a crank pin 55 is rotatably supported on the eccentric hub 52 of the disk 50. The crank pin 55 is guided for radial movement relative to the axis of shaft 49 in a radially extending slot 56 of a yoke member 57 which is connected to rotate with the shaft 49 by reason of having a rectangular opening 58 which engages a pair of flats 59 and 60 formed on one end of the shaft 49. A spring washer 61, as shown in Figures 7 and 10, the washer being of dished shape, is interposed between the worm gear 46 and the disk 50 so as to normally establish a driving connection between the worm gear and the disk. The entire crank assembly is maintained in assembled relation by means of a washer 62 and a snap ring 63 which fits in an annular groove 64 formed in the shaft 49.

Referring again to Figures 2 and 3, the crank pin 55 is pivotally connected to one end of a connecting rod 65. The connecting rod 65 is connected to the oscillatory output shaft 22 which is rotatably supported in the housing 36 by means of a pair of crossed links 66 and 67, the inner ends of which are pivotally connected at 68 and 69, respectively, to spaced points on the connecting rod 65. The outer ends of links 66 and 67 are connected by pins 70 and 71, respectively, to the ends of a rocker arm 72 disposed on opposite sides of the driven shaft 22. This type of linkage is more particularly described in the aforementioned copending applications and constitutes no part of this invention. Suffice it to say that upon rotation of the crank pin 55 about the axis of shaft 49, oscillation will be imparted to the output shaft 22.

The actuating mechanism also includes a latch arm assembly comprising a latch arm 73 pivotally mounted on a shaft 74 supported for pivotal movement in the web 37. The end of the shaft 74 disposed in the chamber 38 is connected to a toggle arm of the type disclosed in the aforementioned copending application Serial No. 450,890, the latch arm 73 being operatively connected with the toggle arm 75 by over-center springs 82 and 83 so as to be moved with a snap action thereby. The toggle arm 75 is actuated by a crank 76 attached to the other end of the shaft 74 and disposed within the chamber 39. The crank arm 76 is operatively connected with a manually movable slider 77 which also controls the motor switch means, not shown. The latch arm 73 is formed with a pair of spaced latching surfaces constituted by the end of an integral extension 78 and a shoulder 79. Both latching surfaces 78 and 79 are adapted to engage the peripheral lug projection of the disk 50 as will be pointed out more particularly hereinafter.

The end of the shaft 22 disposed within the chamber 39 has attached thereto a crank arm 80 for actuating a parking switch, not shown, which deenergizes the electric motor 20 and thereafter establishes a self-generative dynamic braking circuit for the motor, as disclosed in the aforementioned copending application Serial No. 435,012. The crank arm 80 only actuates the parking switch, not shown, when the amplitude of oscillation imparted to the wiper blades is increased to include the angle B in a manner to be described hereinafter.

Operation

The windshield wiper actuating mechanism disclosed in Figures 2 through 11 operates in the following manner. Assuming the mechanism to be in the parked position, as depicted in Figure 2, a complete cycle of operation will be described. To initiate operation, the operator manipulates the slider 77 to energize the electric motor 20. When the electric motor 20 is energized, the crank arm 76 will be actuated so as to snap the toggle arm 75 from the position depicted in Figure 2 to the position depicted in Figure 4. However, the surface 79 will remain in engagement with the peripheral lug projection 51 of the disk 50 by reason of frictional engagement therebetween. During rotation of the worm gear 46 from the angular position of Figure 2 to the angular position of Figure 4, the disk 50 remains stationary while the worm gear 46, the cam member 53 and the yoke 57 rotate in a clockwise direction and in so doing, the cam member 53 rotates about the eccentric hub 52 thereby effecting radial inward movement of the crank pin 55 from the position depicted in Figure 2 to the position depicted in Figure 4. When the worm gear 46 arrives at the angular position of Figure 4, the crank throw has been reduced to a minimum and the cam projection 47 of the worm gear engages the surface 79 of the latch arm 73 and effects pivotal movement thereof in a clockwise direction to the dotted line position depicted in Figure 4. In other words, the cam projection on the worm gear 46 releases the latch arm 73 so that the disk 50 is free to rotate with the worm gear 46 and the cam member 53, which drive connection is established by the spring washer 61. During continued rotation of the worm gear 46, the radial position of the crank pin will be maintained at its innermost position in engagement with the end of the slot 56 in yoke 57. Accordingly, oscillation of fixed amplitude throughout the angle A will be imparted to the driven member 22 and the wiper blades as long as the motor 20 is energized.

When the operator desires to discontinue operation of the wipers, the slider 77 is again actuated and moved to the off position. In moving the slider 77 to the off position, the crank arm 76 is actuated to snap the toggle arm 75 from the position of Figure 4 to the position of Figure 2, and in so doing, the toggle arm 75 will move the latch arm 73 from the inoperative position of Figure 5 to the operative position of Figure 6. When the worm gear 46 and the disk 50 reach the angular position depicted in Figure 6, the first latching surface 78 of the arm 73 will engage the lug projection 51 of the disk 50 so as to restrain rotation thereof. However, inasmuch as the cam projection 47 of the worm gear 46 is maintained in alignment with the lug projection 51 of the disk 50 during running operation of the mechanism, continued rotation of the worm gear 46 by the motor 20, which is now controlled by the parking switch, not shown, will cause the cam projection 47 to engage the surface 79 of the latch arm 73 to disengage the latching surface 78 and the projection 51 by moving the latch arm 73 in a clockwise direction to the dotted line position as depicted in Figure 6. Accordingly, the disk 50 will again rotate with the worm gear 46 until the latching surface 79 engages the projection 51. This will occur since the toggle arm 75 has been positioned to spring bias the latch arm 73 into an operative position and as soon as the cam projection 47 rotates away from the arm 73, the arm will again move to the operative position. When the latching surface 79 engages the lug projection 51, rotation of the disk 50 is positively restrained and during continued rotation of the worm gear 46 and the crank pin 55 in a clockwise direction from the position of Figure 6 to the position of Figure 2, the cam member 53 will rotate about the eccentric 52 and in so doing will move radially outward to increase the throw of the crank pin to a maximum. When the crank pin 55 reaches the angular position depicted in Figure 2, the crank arm 80 will actuate the parking switch, not shown, to simultaneously deenergize the motor 20 and dynamically brake the same to a standstill.

With reference to Figures 12 and 13, a modified embodiment of the crank mechanism is disclosed wherein similar numerals refer to similar parts throughout the several views. In the modified embodiment the latch arm 73 has only the single latching surface 79 while the disk 50 has a pair of circumferentially spaced peripheral lug projections 51 and 81. In all other respects, the crank assembly and the actuating mechanism is identical to that described in conjunction with Figures 1 through 11. Thus, the worm gear 46 is formed with a peripheral cam projection 47 which is normally maintained in alignment with the disk projection 51 during running operation of the mechanism. Similarly, the disk 50 has an eccentric hub 52 about which the cam member 53 carrying the crank pin 55 is rotatably journalled, the crank pin 55 being guided for radial movement in the slot 56 of the yoke member 57.

Operation of the modified embodiment is substantially the same as that of the first embodiment in that when the latch arm 73 is moved to an operative position, as depicted in Figure 12, the surface 79 will first engage the lug 81 of the disk 50. During continued rotation of the worm gear 46 with the disk 50 stationary the cam projection 47 will release the latch arm 73 so that disk 50 will rotate in the clockwise direction until the lug 51 engages the latch surface 79 of the arm 73 at which time the disk 50 will again be restrained against rotation. The worm gear 46 and the crank pin 55 will continue to rotate to the angular position depicted in Figure 13 at which time the motor will be deenergized and dynamically braked to park the wiper blades, since the crank throw has been increased to a maximum. To initiate operation of the actuating mechanism, the latch arm 73 is conditioned for movement to an inoperative position as depicted by dotted lines in Figure 12, and as soon as the worm gear 46 rotates to the angular position at which the cam projection 47 engages the latch arm 73, the crank throw will have been reduced to a maximum and the latch arm 73 will be released so that the disk 50 will rotate with the worm gear 46. Thus, during normal running operation, the crank throw is maintained at a fixed radial distance so that oscillation of fixed amplitude will be imparted to the wiper blades.

From the foregoing it is apparent that the present invention results in a crank assembly wherein the throw of the crank is varied by eccentric means without the necessity of utilizing a torsion spring. Thus, in the instant crank assembly, the radius of the crank pin is gradually increased and gradually decreased in a manner which results in decidedly quieter and smoother operation of the actuating mechanism.

While the embodiments of the invention as herein disclosed constitute preferred forms, it is to be understood that other forms might be adopted as may come within the scope of the claims which follow.

What is claimed is as follows:

1. Windshield wiper actuating mechanism including, a rotatable driving member, a wiper actuating driven member, a rotatable driven element, means interposed between said driven element and said driving member to establish a driving connection therebetween, means interconnecting said driving and driven members including a variable throw crank, and cooperable latch, lug and cam means operable to successively restrain, free and thereafter again restrain rotation of said driven element by interrupting the driving connection between the driven element and the driving member so as to vary the throw of said crank.

2. A variable throw crank assembly including in combination, a rotatable shaft, a crank member connected to rotate with the shaft but adapted for radial movement relative thereto, a driving member connected to the shaft for imparting rotation thereto, an element rotatably journalled on the shaft and having eccentric means engaging said crank member, means interposed between said driving member and said element for establishing a driving connection therebetween, and means for successively restraining, freeing and thereafter again restraining rotation of said element by interrupting the driving connection between the element and said driving member to vary the radial position of said crank member.

3. Windshield wiper actuating mechanism including, a rotatable driving member, a wiper actuating driven member, a rotatable driven element, means interposed between said driven element and said driving member to establish a yieldable driving connection therebetween, means interconnecting said driving and driven members including a variable throw crank, eccentric means carried by the driven element and operatively associated with said crank, and cooperable latch, lug and cam means operable to successively restrain, free and thereafter again restrain rotation of the driven element during continued rotation of the driving member so as to vary the throw of said crank.

4. Windshield wiper actuating mechanism including, a rotatable driving member, a wiper actuating driven member, a rotatable driven element, resilient friction means interposed between the driven element and the driving member to establish a driving connection therebetween, means interconnecting the driving and driven members including a variable throw crank, an eccentric hub on said driven element about which said crank is supported, and cooperable latch, lug and cam means operable to successively restrain, free and thereafter again restrain rotation of the driven element so as to effect relative angular movement between said eccentric hub and said crank to vary the throw of said crank.

5. Windshield wiper actuating mechanism including, a rotatable driving member, a wiper actuating driven member, a rotatable driven element, a spring washer interposed between said driven element and said driving member to establish a driving connection therebetween, means interconnecting the driving and driven members including a variable throw crank, eccentric means carried by the driven element and engaging said crank, and cooperable latch, lug and cam means operable to successively restrain, free and thereafter again restrain rotation of the driven element during continued rotation of the driving member so as to vary the throw of said crank.

6. Windshield wiper actuating mechanism of the character set forth in claim 5 wherein said last recited means includes a manually operable, spring biased latch arm having first and second spaced latching surfaces, a peripheral lug on said driven element, and a cam projection on said driven member engageable with said latch arm for releasing the same whereby engagement of the first latching surface with said lug will restrain rotation of the driven element until the cam projection releases the latch arm during continued rotation of the driven member so as to free the driven element for rotation with the driven member until the second latching surface engages said lug.

7. Windshield wiper actuating mechanism of the character set forth in claim 5 wherein said last recited means includes a manually operable, spring biased latch arm having a latching surface, first and second circumferentially spaced peripheral lugs on said driven element, and a cam projection on said driven member and engageable with the latch arm for releasing the same whereby engagement of the first lug with the said latch arm will restrain rotation of the driven element until the cam projection releases the latch arm during continued rotation of the driven member so as to free the driven element for rotation with the driving member until the second lug is moved into engagement with the latch arm.

8. A variable throw crank assembly including in combination, a rotatable shaft, a crank member connected to rotate with the shaft but adapted for radial movement relative thereto, a driving member connected to the shaft for imparting rotation thereto, a disk rotatably journalled on the shaft and having eccentric means engaging the crank member, a spring washer interposed between the driving member and the disk for establishing a driving connection therebetween, and means for successively restraining, freeing and thereafter again restraining rotation of said disk during continued rotation of said driving member to vary the radial position of said crank member.

9. A variable throw crank assembly including in combination, a rotatable shaft, a crank member connected to rotate with the shaft but adapted for radial movement relative thereto, a driving member connected to the shaft for imparting rotation thereto, a disk rotatably journalled on the shaft and having eccentric means engaging said crank member and a peripheral lug, means interposed between the driving member and said disk for establishing a yieldable driving connection therebetween, and a manually operable, spring biased latch arm having first and second spaced latching surfaces engageable with the lug on said disk, said driven member having a cam projection normally in alignment with said lug and engageable with said latch arm for releasing the same whereby when said latch arm is moved to an operative position the first latching surface will engage said lug to restrain rotation of the disk during continued rotation of the driving member until the cam projection releases the latch arm, after which the second latching surface will engage the lug on said disk to restrain rotation of the disk to vary the radial position of the crank member.

10. A variable throw crank assembly including in combination, a rotatable shaft, a crank member connected to rotate with the shaft but adapted for radial movement relative thereto, a driving member connected to the shaft for imparting rotation thereto, a disk rotatably journalled on the shaft and having eccentric means engaging the crank member and first and second spaced peripheral lugs, means interposed between the driving member and the disk for establishing a yieldable driving connection therebetween, and a manually operable, spring biased latch arm engageable with the lug projections on said disk, said driving member having a cam projection normally in alignment with the second lug and engageable with said latch arm for releasing the same whereby when the latch arm is moved to an operative position it will engage the first lug on said disk and restrain rotation of the disk until the cam projection on the driving member releases the latch whereupon the disk will rotate until the second lug engages the latch so as to restrain rotation of the disk and vary the radial position of the crank member.

References Cited in the file of this patent

UNITED STATES PATENTS

| | | |
|---|---|---|
| 2,308,212 | Scott-Iversen | Jan. 12, 1943 |
| 2,491,697 | Vischulis | Dec. 20, 1949 |
| 2,513,247 | Morton | June 27, 1950 |
| 2,749,498 | Lautzenhiser | June 5, 1956 |